Oct. 2, 1951  W. E. STOWELL  2,569,874
ROTARY CARVING TOOL
Filed June 21, 1949

INVENTOR.
WILLIAM E. STOWELL
BY

Patented Oct. 2, 1951

2,569,874

UNITED STATES PATENT OFFICE 2,569,874

ROTARY CARVING TOOL

William E. Stowell, Provo, Utah

Application June 21, 1949, Serial No. 100,478

1 Claim. (Cl. 29—103)

This invention relates to a rotary carving tool, and has for one of its objects the production of a simple and efficient carving tool or drill for facilitating the carving or cutting of plastic material and the like, at a radical angle laterally of the normal longitudinal axis of the drill or work, in a manner whereby internal decorative designs may be carved inwardly of a block or piece of transparent translucent or other plastic, and in a direction to the side of the entrance aperture, to produce a pleasing decorative display.

A further object of this invention is the production of a simple and efficient rotary carving tool which is provided with one or more flattened sides to present a longitudinally extending cutting edge exteriorly of the flutes of the drill or tool, the flutes providing means for facilitating the removal or ejection of cut particles from the cutting edge of the tool while the tool is carving or cutting material such as plastic and the like.

Other objects and advantages of the present invention will appear throughout the following specification and claim.

Figure 1:
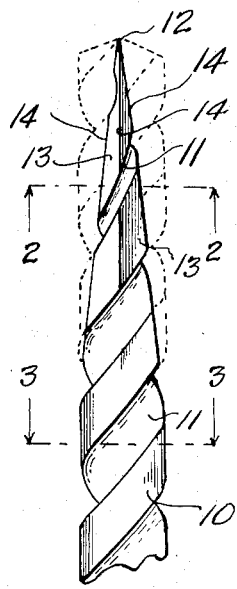
Figure 1 is a side elevational view of the improved rotary carving tool, the dotted lines illustrating the portion of the drill which is trimmed or cut-away to provide a tapering point which is triangular in cross-section.

By referring to the drawing, it will be seen that 10 designates a conventional drill having conventional flutes or spiral channels 11. The cutting or outer end of the tool or drill 10 is tapered, preferably to a point or suitable apex 12 either pointed, rounded, or formed to suit the type of internal carving to be performed. The cutting or outer end of the tool preferably is provided with three longitudinally extending flat tapering and converging side faces 13 to define three converging cutting edges 14 which are crossed by the spiral channels or flutes 15. These flutes or channels will provide means for ejecting, discharging or removing particles of the plastic or other material which are cut by the tool while internally carving the work or material.

Figure 6:
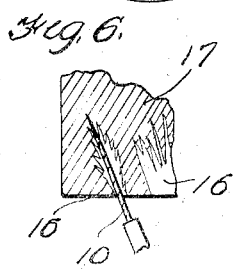
Figure 6 is a fragmentary vertical sectional view of a display piece illustrating the manner in which leaves and flowers such as are shown in Figure 5 may be carved in a piece of plastic or other material.

Various internal decorative or artistic designs may be cut or carved, as at 16, within the plastic block, piece or section 17, to create a pleasing display and these cut designs may be stained, colored or tinted to provide a variety of color displays within varied shapes of material, one type being shown in Figure 6.

Figure 4:
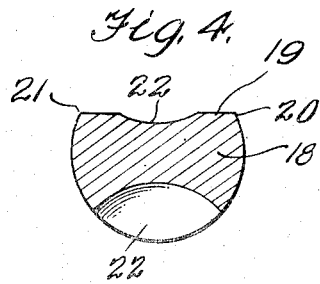
Figure 4 is an enlarged transverse sectional view showing a modified type of tool.
Figure 5:
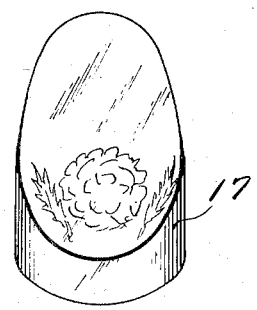
Figure 5 is a perspective view of one type of display piece carved by the improved tool.

As shown in Figure 4, the drill 18 of a conventional type may be provided at its cutting end with only one flat face 19 defining cutting edges 20 and 21 which extend longitudinally of one end of the drill 18. The drill 18 is provided with the conventional spiral channels or flutes 22.

It is important to note that the present invention primarily embodies a conventional drill having a spiral flute or flutes in the periphery thereof, the cutting end of the drill being longitudinally flattened and tapered to define a plurality of converging cutting edges which edges are crossed at spaced intervals by the spiral channels or flutes to convey chips or cut particles cut from the work, plastic or other material, outwardly of the hole which is being cut. Furthermore, due to these tapering flat sides at the pointed cutting end of the tool and the cutting edges 14 in the form shown in Figures 1 and 2, the tool is adapted to cut sideways or laterally of the entrance opening to facilitate the internal carving of material in decorative designs, such as flowers, leaves, and the like.

Figure 2:
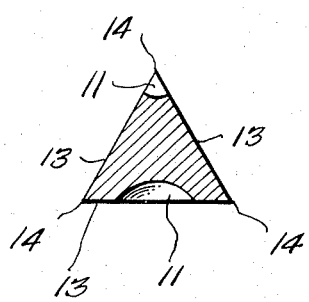
Figure 2 is an enlarged transverse sectional view taken on line 2—2 of Figure 1.
Figure 3:
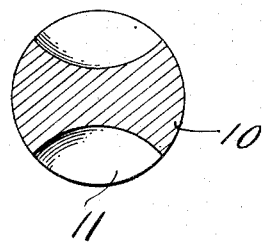
Figure 3 is an enlarged transverse sectional view taken on line 3—3 of Figure 1.

By carefully noting Figure 1 it will be seen that the tool is provided with a plurality of relatively flat elongated converging faces merging into an apex point thereby defining a plurality of longitudinally extending converging cutting edges which terminate in said apex point at one extremity of the tool. It should be further noted that the spiral channel 11 extends angularly across the cutting edges at an incline and crosses the cutting edges 14 at a plurality of locations within the lengths of the cutting edges 14. This channel defines a material-conveying channel throughout the length of the tool for conveying cut material away from the cutting edges and longitudinally of the body to prevent clogging of the tool during operation.

It should be further noted that various shapes may be employed to define a cutting point or end for the drill having a plurality of cutting edges converging to a point or apex and extending longitudinally of the tool or drill. One type of a modified form is shown in Figure 4 wherein two cutting edges 21 and 22 are shown and are formed by providing only one flat face 19.

By means of the tool which I have devised it is obvious that new and novel designs in internal carving may be created and the formation of said designs greatly facilitated, due largely to the fact that lateral or side cutting is possible owing to the longitudinal cutting edges of the tool and the fact that the tool will not clog. The flutes will carry the cut particles away from the work and away from the cutting edges of the tool.

The length of the tapering point which preferably is triangular in cross-section, may be made of any desired proportion with respect to the length of the drill, depending upon the nature of the work to be performed thereby. The tool, such as the tool 10, is adapted to be carried by any suitable rotary tool holder or drill bit holder of a conventional type. The same is true of the tool 18.

It should be understood that certain detail changes in the construction of the tool may be employed without departing from the spirit of the invention, so long as such changes fall within the scope of the appended claim.

Having described the invention, what is claimed as new is:

A rotary carving tool comprising a body having an elongated tapering cutting end, said cutting end having a plurality of elongated relatively flat tapering and converging faces merging into an apex and penetrating point at one end of said tool thereby defining a plurality of longitudinally extending cutting edges terminating in said apex point at one extremity of the tool, and said body having a spiral channel angularly crossing said cutting edges at an incline and at a plurality of locations within the lengths of said cutting edges and extending from said apex point to the opposite end of the tool thereby defining a material-conveying channel throughout the length of the tool for conveying cut material away from the cutting edges and longitudinally of the body to prevent clogging of the tool during operation.

WILLIAM E. STOWELL.

REFERENCES CITED

The following references are of record in the file of this patent:

UNITED STATES PATENTS

| Number | Name | Date |
|---|---|---|
| 48,759 | Zimmerman | July 11, 1865 |
| 258,390 | Dudley | May 23, 1882 |
| 476,817 | Pratt | June 14, 1892 |
| 716,441 | Latham | Dec. 23, 1902 |
| 1,519,876 | Phelps | Dec. 16, 1924 |
| 2,113,178 | Gase | Apr. 5, 1938 |
| 2,328,629 | Eich et al. | Sept. 7, 1943 |

FOREIGN PATENTS

| Number | Country | Date |
|---|---|---|
| 369,523 | Italy | Mar. 22, 1939 |
| 612,288 | Great Britain | Nov. 10, 1948 |

OTHER REFERENCES

Popular Science, August 1947, pages 160–164.